Feb. 3, 1959    M. MENDELSOHN ET AL    2,872,362
BATTERY ELECTROLYTE
Filed Jan. 5, 1956
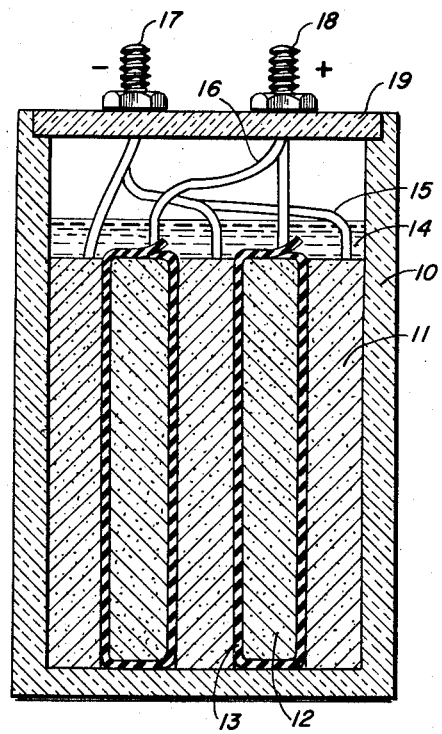
INVENTORS
MEYER MENDELSOHN
CARL HOROWITZ
BY
J. B. Burke
ATTORNEY

2,872,362
BATTERY ELECTROLYTE

Meyer Mendelsohn, New York, and Carl Horowitz, Brooklyn, N. Y., assignors to Ions Exchange & Chemical Corp., New York, N. Y., a corporation of New York Application January 5, 1956, Serial No. 557,626

2 Claims. (Cl. 136—157)

The present invention relates to the art of electric batteries employing alkaline electrolyte and particularly concerns a novel battery electrolyte.

In batteries of the aforementioned type it is particularly desirable to obtain maximum storage of electric charge and maximum shelf-life, and to avoid loss of the electrolyte through leakage. It has been discovered according to the invention that these characteristics can be obtained in a battery employing an alkaline electrolyte by the addition to the electrolyte of gelling and/or wetting agents. Agents which have proven suitable are hydroxytoluene compounds and their phenolic homologues soluble in an aqueous solution of potassium hydroxide as described below.

It is a principal object of the invention to provide a battery electrolyte of the alkaline type with low-surface-tension characteristics.

It is a further object to provide an electrolyte of the characteristic set forth above wherein the surface-tension depressant also acts as a gelling agent.

Other objects and advantages of the invention will become apparent from the following description.

In batteries of the silver-zinc type such as disclosed in U. S. Patent No. 2,594,711 a rechargeable battery is provided whose casing contains an electrode assembly having positive silver oxide electrodes and negative zinc electrodes alternately disposed and separated by membranes, of cellophane or the like, semi-permeable to electrolyte. The battery is activated by an alkaline electrolyte comprising potassium hydroxide (KOH). The interelectrode spacers or separators are substantially homogeneous sheets of organic material which are compressed between the electrodes in the casing in such a manner as to interfere but slightly with the circulation of free electrolyte around the electrodes.

It has been observed that during the life of these batteries a "treeing" effect may occur in which crystals of zinc metal appear to have grown out of the negative zinc electrodes and penetrated the separators to contact the positive silver electrodes. These growths reduce the energy output of the battery by short-circuiting the electrodes.

It has been found that the absorption of electrolyte in the granular structure of the electrodes is limited by the high surface tension of the electrolyte. If this surface tension is reduced, a greater storage of electric charge, a higher energy output and longer shelf-life results.

By using the electrolyte of this invention it is observed that the "treeing" effect is substantially eliminated. This is believed due to better irrigation and wetting of the cell electrodes. An improvement in the length of life of the battery is also observed.

It is proposed according to the present invention to provide in the electrolyte solution a hydroxytoluene compound or homologous hydroxyl- and methyl-substituted benzene compound which serves as a surface-tension depressant for an aqueous alkaline solution such as a 44% potassium hydroxide solution. Also, a compound of these types using a sulfonic acid group attached to the benzene ring nucleus may be used; but chloride substitution products have been found ineffective as surface-tension depressants for potassium hydroxide.

Tests have shown that a battery of the silver-zinc type containing as electrolyte an aqueous solution of sodium or potassium hydroxide and monohydroxytoluene has improved output capacity and discharge voltage, and that the length of time required for preconditioning, i. e. soaking the electrode assembly in electrolyte before it can be charged, is reduced. Further, in such a battery a greater quantity of electrolyte-permeable separator material may be used between the electrodes without increasing the internal resistance of the battery. By increasing the amount of separator material the battery attains a longer shelf-life.

Electrolyte leakage is often encountered with batteries employing wholly liquid electrolyte. When a non-spillable, yet highly conductive electrolyte is desired, the electrolyte may be in the form of a gel. This gel according to the invention may comprise water, about 44% potassium hydroxide and a methyl-substituted phenol compound, whereby the battery is rendered substantially free from electrolyte leakage.

In order to illustrate the invention, the following examples are given:

Example I

To 1000 grams of an aqueous solution of 44% potassium hydroxide (KOH) are added 5 grams of hydroxytoluene. This hydroxytoluene may be cresol containing a mixture of substantially equal parts of the isomeric forms ortho-, meta- and para-hydroxytoluene. Cresol is also known as methyl phenol. The alkaline solution becomes cloudy when the hydroxytoluene is first added. The cloudy liquid is permitted to stand until a cloudy supernatant substance rises to the surface, leaving a clear solution underneath which is then withdrawn. This clear aqueous solution of hydroxytoluene and potassium hydroxide has a lower surface tension than does a solution containing such potassium hydroxide alone.

If the clear solution is added to a silver-oxide/zinc battery of the type mentioned above and shown in U. S. Patent 2,594,711, the battery will be found to have an improved output capacity and discharge voltage. Further the length of time required for soaking the battery electrode assembly in electrolyte before the battery can be charged is reduced, when compared with a similar battery employing a potassium hydroxide solution alone as the electrolyte.

The improved characteristics of the battery are found to be due to increased wetting of the separator material and electrodes by the electrolyte. The quantity of the hydroxytoluene may vary from 0.1% to 2.0% of the electrolyte weight. The hydroxytoluenes used have a chemical formula $CH_3C_6H_4OH$ and may be used in any one of the three known isomeric forms as well as mixtures thereof.

Example II

To 1000 grams of an aqueous solution of 44% potassium hydroxide (KOH) are added 5 grams of p,p' isopropylidenediphenol, $(CH_3)_2C(C_6H_4OH)_2$, known commercially as Bisphenol A. The mixture is heated until the diphenol dissolves. A silver/zinc oxide battery of the type described above is heated at 75° C. for about one half hour and is then filled with the hot solution. In a short time the electrolyte cools to room temperature (about 20°–25° C.) and solidifies completely as a gel. Since the diphenol is a surface-tension depressant for KOH, the wetting of the electrodes and separator by the electrolyte is improved. Since the electrolyte has the consistency of a gel, leakage is substantially prevented.

The storage life of the battery is also considerably improved. The output capacity and discharge voltage of the battery are not impaired by use of this gel electrolyte.

If less than 5 grams of the diphenol in 1000 grams of an aqueous solution of 44% KOH are used the gel will be somewhat softer. More than 5 grams of the diphenol will produce a harder gel. It has been found that optimum results are obtained by using about 5 grams of the diphenol in the alkaline electrolyte. The structural formula for p,p' isopropylidenediphenol used in the gel electrolyte is:

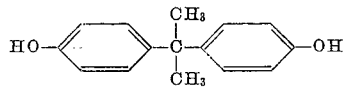

The electrolytes according to the invention may be used in primary or secondary batteries employing alkaline electrolytes. They have been found particularly adapted for use in silver-zinc batteries of rechargeable types which in a charged condition contain silver-oxide positive electrodes and negative zinc electrodes and which utilize concentrated KOH as their electrolyte. The invention is applicable to other alkaline electrolytes, such as sodium hydroxide.

Batteries using the electrolyte of the instant invention have a longer shelf-life because the electrolyte has an increased ability to wet and penetrate the collophane separators and the silver oxide and zinc electrodes used in the batteries of the type referred to above. This characteristic of the electrolyte permits use of more layers of separator material and greater thickness of separator material between the electrodes, without substantially increasing the internal resistance of the cell.

In the drawing is shown a battery of the type in which the electrolytes described above may be used. A rectangular casing 10 contains a plurality of positive electrodes 12 which may be silver or silver oxide plates juxtaposed in alternation with negative electrodes 11 which may be zinc or zinc oxide plates, with separators 13 therebetween. The positive electrode plates are shown wrapped in the separator sheets or envelopes which are made of a semi-permeable material such as regenerated cellulose (cellophane). Positive plates 12 are connected by lead wires 16 to the common positive terminal 18. Negative plates 11 are connected by lead wires 15 to the common terminal 17. The terminals 17 and 18 are mounted on the cover 19 of the casing. An alkaline electrolyte 14 in the casing is provided in sufficient quantity to saturate the electrodes and separator sheets 19. The electrolyte will be in liquid or in gel form as described above. Although only a single layer of separator material is shown in the drawing, two or more layers may be used. Upon absorption of the electrolyte the separator sheets 13 and negative electrodes 11 expand to cause the entire assembly of electrodes and separators to be compressed between the walls of the casing as is necessary in this type of battery.

What is claimed is:

1. In an alkaline battery, an electrolyte comprising a concentrated aqueous solution of potassium hydroxide containing p,p' isopropylidenediphenol, said isopropylidenediphenol being present in an amount substantially exceeding 0.1%, by weight, of said solution.

2. In an alkaline battery, a gelled aqueous electrolyte comprising a concentrated aqueous solution of potassium hydroxide containing at least 0.5% by weight of p,p' isopropylidenediphenol.

References Cited in the file of this patent

UNITED STATES PATENTS

| | | |
|---|---|---|
| 1,137,226 | Manchester | Apr. 27, 1915 |
| 1,773,445 | Bullen et al. | Aug. 19, 1930 |
| 1,839,905 | Tainton | Jan. 5, 1932 |
| 2,370,986 | Nachtman | Mar. 6, 1945 |
| 2,428,850 | Lawson | Oct. 14, 1947 |

FOREIGN PATENTS

| | | |
|---|---|---|
| 534,618 | Great Britain | Mar. 12, 1941 |